Jan. 1, 1952 K. F. RUSSELL 2,580,703
AIR CLEANER OF THE OIL-BATH TYPE
Filed Jan. 31, 1947 2 SHEETS—SHEET 2

INVENTOR:
KENNETH F. RUSSELL
BY HIS ATTORNEYS
HARRIS, KIECH, FOSTER & HARRIS

Patented Jan. 1, 1952

2,580,703

UNITED STATES PATENT OFFICE 2,580,703

AIR CLEANER OF THE OIL-BATH TYPE

Kenneth F. Russell, Claremont, Calif., assignor to Herman H. Garner, Claremont, Calif.

Application January 31, 1947, Serial No. 725,672

15 Claims. (Cl. 183—15)

This invention relates to air cleaners of the oil-bath type which are adapted to be used in conjunction with internal combustion engines, compressors, and other apparatus for which clean, dust-free air is required.

In such devices filter packs are used which commonly cause resistance to air flow in conjunction with the oil of the bath, and principal objects of the invention are to provide apparatus having any one or more of the following characteristics: the ability to insure low restriction of air flow through the apparatus; the ability to return oil rapidly from the filter so as to clean washing oil from the filter as rapidly as possible and correspondingly reduce resistance to air flow through the filter; the ability to distribute the washing oil quickly through the filter; the ability to pass most of the returning wash oil directly to an oil storage zone for separation of solids; and the ability to establish over the return point to the storage zone a low pressure area assisting oil distribution and oil separation for passage to such return point.

Another object of the invention is to provide in an oil-bath filter a barrier wall or divider plate between an oil storage and supply zone and an oil entrainment zone, which wall will have a relatively elevated and relatively large oil-return opening whereby to establish an oil head in the storage zone for positively feeding oil through a peripheral feed passage to supply the oil entrainment zone.

A further object is to provide an arrangement of such barrier wall and oil-return opening with respect to an air supply channel and an air discharge passage so that a low velocity and low pressure area is produced above the return opening to assist oil and air distribution following entrainment and to assist oil separation and oil return to the storage zone.

It is also an object of the invention to arrange filter elements, both prefilters and main filters, so that returning oil washes both the prefiltering or lower initial filtering portions of the filter elements as well as the main or upper portions, whereby to accomplish high oil circulation and to insure thorough washing and cleansing of both upper and lower filter portions. A coincidental object is the return of the bulk of such oil from the cleansing of the filter portions directly into the storage zone for settling of solids washed from such filter portions.

Other objects of the invention and the various features thereof will appear from the following specification and the accompanying drawings wherein one embodiment of the invention is disclosed for the purpose of illustration.

In the drawings:

Fig. 1A is a fragmentary cross-section taken on the line 1A—1A of Fig. 1;

Figure 1:
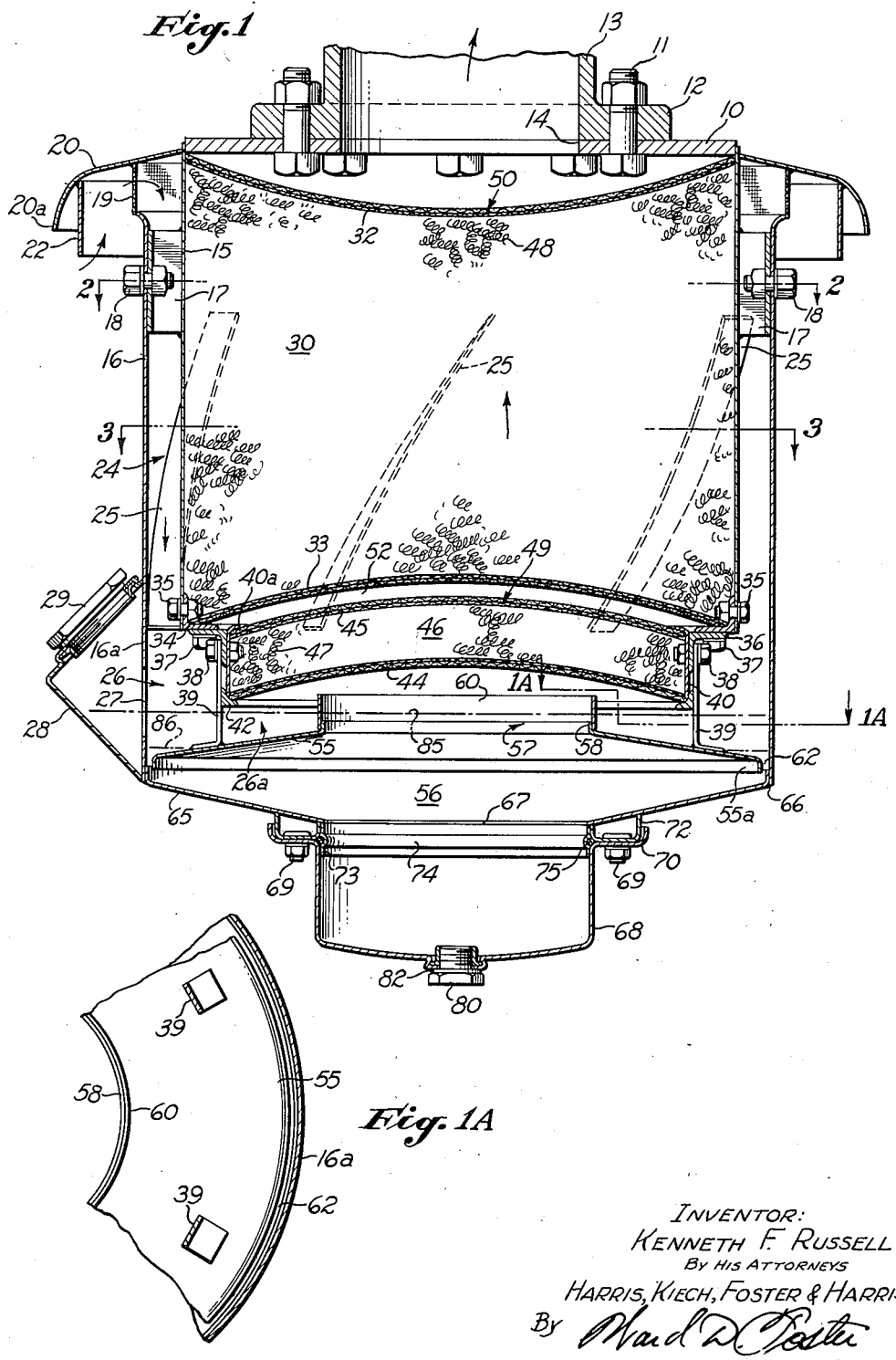
Fig. 1 is a vertical transverse section taken on the line 1—1 of Fig. 2.

The cleaner construction shown comprises a circular rigid top plate 10 which is adapted to be attached by bolts 11 to an annular flange 12 of a pipe 13 which supports the cleaner and conducts cleaned air from the device. The top plate 10 is provided with a discharge opening 14 for the purpose of communication between the pipe 13 and the interior of the air cleaner.

Figure 2:
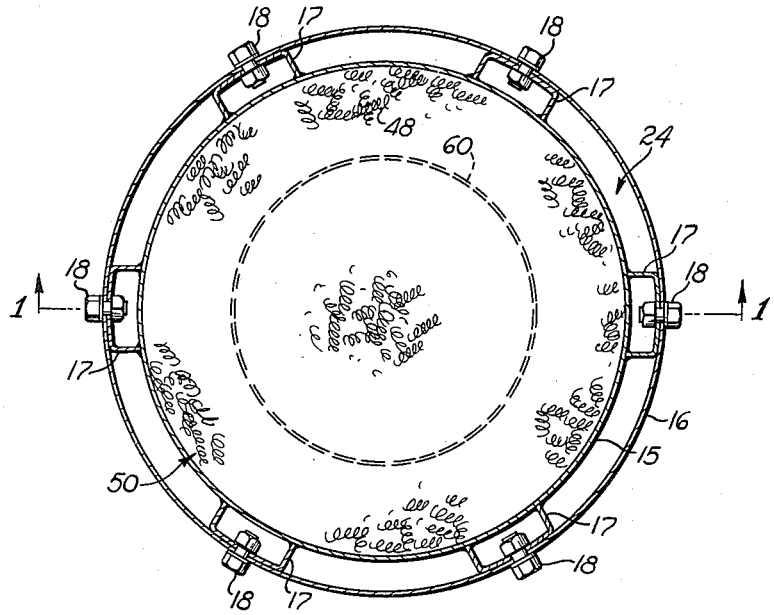
Fig. 2 is a horizontal cross-section taken approximately on the line 2—2 of Fig. 1.
Figure 3:
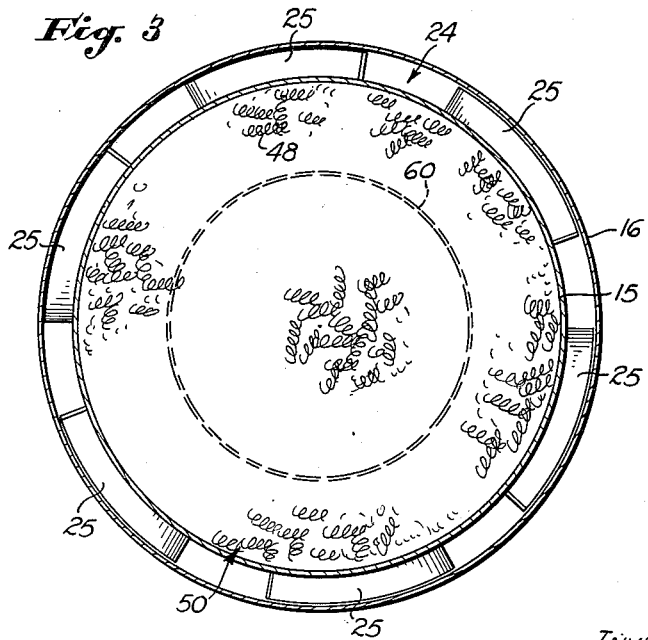
Fig. 3 is a horizontal cross-section taken approximately on the line 3—3 of Fig. 1.

The peripheral edge of the top plate 10 supports a cylindrical inner casing 15 which constitutes a filter housing, the upper end of the casing 15 being secured to the edge of the plate 10 in airtight relationship, welding being preferably employed as indicated. Outside of the inner casing 15 there is disposed an outer casing 16 which provides an outer cylindrical housing for the structure, the casing 16 being appropriately spaced from the inner casing 15 by means of a series of U-shaped brackets 17 best illustrated in Fig. 2, the legs thereof being secured to the adjacent wall of the inner casing 15 in any desirable manner, such as welding, and the outer casing 16 being attached to the middle portions of the brackets by means of screws or small bolts 18. The upper edge of the outer casing 16 is preferably flared outward as illustrated in Fig. 1 to provide a suitable entering throat for air entering the resultant annular passage between the two casings, and at the peripheral upper edge of the casing 16 the lower end of an annular screen 19 is positioned, this screen being provided for the purpose of catching large particles of materials such as leaves which the air might carry. The upper edge of the annular screen 19 is secured as by welding to the under face of an annularly disposed rain guard 20 whose inner edge is secured in airtight relationship to the outer wall of the upper end of the inner casing 15. The outer edge of the rain guard 20 is sharply downturned as indicated at 20a to provide an eave or lip from which rain may fall. In order to prevent drops of water from being entrained in the air stream which would otherwise rush past the eave 20a, a depending deflector sleeve 22 is provided, this sleeve 22 being spaced from the eave 20a an appropriate distance and also depending below the eave 20a an appropriate distance. In practice these distances are approximately equal, and best results are obtained when they are three-quarters of an inch. To seal off passage of air between the deflector sleeve 22 and the rain guard 20 the upper edge of the sleeve 22 is secured in relatively air-tight relationship to the under side of the rain guard 20, welding being employed as a convenient means of attachment as in the case of the other connections described. The spacing of the inner and outer casing 15 and 16 from each other provides an annular air-inlet passage 24 extending from the flared upper edge of the outer casing 16 to the lower edge of the inner casing 15. Disposed within this annular inlet passage 24 is a plurality of inclined vanes 25 whose widths are the width of the passage 24 and equal to the depth of the U-shaped brackets 17. One edge of each of the vanes 25 is secured, as by welding, to the adjacent wall of one of the casings 15 and 16, for example the inner casing 15. The inclination of the vanes 25 is such as to impart to entering air a desired rate of centrifugation. As indicated, the angularity of the vanes 25 may approximate 30° to the vertical.

Air which passes downward through the annular air-inlet passage 24 then travels into an annular oil entrainment chamber 26 of greater cross-sectional area than annular passage 24. The chamber 26 is enclosed within a lower extension 16a of the outer casing 16, this extension lying below the lower end of the inner casing 15. At one side of the entrainment chamber 26 a filler opening 27 is provided for the purpose of introducing oil into the apparatus, there being a filler neck 28 secured to the outer face of the corresponding portion of the casing 16, the neck being conventionally closed by a filler cap 29.

The inner casing 15 provides a main filter chamber 30 whose upper end is defined by a transversely disposed upper retention screen 32, which, as shown, has an inverted dome-shape, and may be composed of two contiguous wire screen members of appropriate mesh and gauge. The lower end of the main filter chamber 30 is defined by a lower retention or supporting screen 33 transversely disposed across the mouth at the lower end of the casing 15 and of upright dome formation, this screen 33 also being formed by two wire screen members, if desired, and of appropriate mesh and gauge. The peripheral edge of the lower screen 33 is carried upon an angle ring or annular flange 34 secured to the lower end of the inner casing 15 by small bolts 35.

The transverse web of the annular angle ring 34 carries on its under side an annular angle support 36 which is secured by means of a plurality of bolts 37. The vertical web of the angle support 36 has attached thereto by means of bolts 38 a plurality of depending suspension straps 39 and also has attached thereto, by welding, a narrow cylindrical retainer wall 40.

Welded to the lower edge of the cylindrical retainer wall 40 is an annular angle shoulder member 42 upon which is supported the peripheral edge of a dome-shaped lower prefilter supporting screen 44. Spaced somewhat above the screen 44 is another dome-shaped prefilter screen 45 which is secured to and positioned by an inwardly directed annular flange 40a constituting an upper extension of the cylindrical retainer wall 40. The prefilter screens 44 and 45, each of which may be two screen members, as shown, thus provide between them a shallow prefilter chamber 46. The prefilter chamber 46 contains a filter pack consisting of a mass of resilient coil springs 47 and the main filter chamber 30 contains a filter pack consisting of a mass of resilient coil springs 48. The springs 47 and 48 are identical in practice and each of the filter packs provided thereby is in the form of a coherent mass of intermeshed, positively interlinked, open-ended resilient coil springs, preferably formed of fine wire of about 0.01 inch in diameter. The mass is compressed to eliminate wear due to vibration of the apparatus upon which the device is employed and the whole body of each filter pack is, by such compressing, interlinking and intermeshing, formed into a resilient body which holds together even when removed from its container.

The screens 44 and 45, the cylindrical wall 40 and the mass of coil springs 47 contained therewithin constitutes a prefilter 49 carried within the annular angle support 36. The upper and lower retention screens 32 and 33 within the inner casing 15 and the filter pack formed by the mass of coil springs 48 constitute a main filter 50 through which the air being cleaned passes following passage of the air through the prefilter 49. As illustrated, there may be a small air space 52 between the prefilter 49 and the main filter 50. It will be observed that the prefilter 49 is of somewhat smaller diameter than the main filter 50, the difference amounting approximately to the transverse area of the annular angle support 36, and the main portion of the oil entrainment chamber 26 having its cross-sectional area correspondingly increased.

Affixed to the lower ends of the suspension straps 39, which are removably carried by the annular angle support 36, is an annular barrier plate 55 which constitutes a dividing wall between the oil entrainment chamber 26 and an oil storage chamber 56 therebelow. The plate 55 has a relatively large central circular opening 57 which is defined by an upstanding annular flange 58 positioning a short cylindrical standpipe 60 serving the purpose of establishing an oil head, as presently to be explained. The diameter of the opening 57 in the standpipe 60 is approximately one-half the diameter of the filter chamber 30 and one purpose of the large diameter is to provide for the direct return of substantially all of the returning oil from the filter into the oil storage chamber 56. The bulk of the returning oil follows this path, as also to be present explained. The barrier plate 55 is imperforate apart from the opening 57, and, as shown, slopes laterally outward and downward to its periphery which is in the form of an annular downturned lip 55a which is spaced slightly from the adjacent inner wall of the extension 16a of the outer cylinder 16 so as to provide an annular passage 62 for the upward travel of oil from the oil storage chamber 56 to the oil entrainment chamber 26. It will be observed that the barrier plate 55 extends inward under the prefilter 49 and consequently forms a shallow inwardly disposed annular extension 26a of the oil entrainment chamber 26.

Below the barrier plate 55 there is provided a bottom wall 65 of the air cleaner, this bottom wall sloping downward toward the center and having its outer edge flanged upward to fit within the lower extremity of the extension 16a of the outer casing 16 where it is welded in oil-tight relationship as indicated at 66. The bottom wall 65 is centrally provided with an opening 67 and a depending oil cup 68 is attached to the bottom wall 65 around the edge of such opening 67. This attachment may be accomplished through the medium of removable short bolts 69 which pass through an annular flange 70 carried by the upper edge of the oil cup, these bolts being supported by an annular bracket 72 tightly welded to the bottom wall 65 around the opening 67 so as to prevent oil leakage. To provide an oil seal between the oil cup 68 and the bracket 72 a depending skirt 73 is spot welded or otherwise tacked to the innermost face of the bracket 72 and this skirt 73 is provided with an inwardly offset annular bead 74 in which is received a "neoprene" or other oil resistant resilient sealing ring 75 so disposed as to engage an adjacent curved shoulder at the joint between the oil cup 68 and its flange 70.

The oil cup 68, especially due to its position below the opening 57 in the barrier plate 55 and in line with the standpipe 60, serves as a sump or trap to accumulate foreign materials settling from the oil which has been received from the filters 49 and 50 following oil cleaning. Intermittent removal of sludge and the like may be accomplished by removal of a bottom drain plug 80 which cooperates with a gasket 82 in a conventional manner.

Operation

Important aspects of this invention are found in the disposition of the filtering means provided by the prefilter 49 and the main filter 50 above the large opening 57 in the barrier plate 55, whereby oil returning from the filters falls directly into the oil storage chamber 56, and also in the disposition of the filtering means with respect to such opening 57 and with respect to the oil entrainment chamber 26 and its extension 26a, so that oil picked up by the air as it travels from the air inlet passage 24 through the oil entrainment passage 26 and its extension 26a is rapidly distributed through the filters and moves to a central low pressure zone in the filters above the opening 57 whereby the oil separates rapidly in the filters following washing of the air and returns rapidly to the oil storage chamber 56. These effects are inherent in the apparatus disclosed, and the apparatus is adapted especially to operation under low air velocity with the employment of a minimum amount of washing oil whereby to effect the very low air restriction which is required in the apparatus under low velocity operations, and especially where the apparatus is to be used for long periods of time, for example, thirty to forty days, without shutdown.

In the employment of the apparatus disclosed, air intake is effected through suction or other draft means of engines and other equipment with which the apparatus is employed, such suction being effective through the supporting pipe 13 of the embodiment shown. The air enters the annular space within the deflector sleeve 22 under the rain guard 20 and passes through the screen 19, whence it turns downward and passes down through the annular air intake passage 24 between the inner casing 15 and the outer casing 16. Such movement is effected by the differential of pressure between the atmosphere outside the casing 16 and the low pressure produced by the suction equipment being supplied. Oil is initially introduced into the air cleaner to assume a level approximately at the broken line 85 which preferably lies below the top of the standpipe 60 and also below the annular shoulder member 42 upon which rests the lower screen 44 of the prefilter 49. The oil level may be varied to meet conditions. For constant operation at high air flows, the level may be lowered to obtain lower resistance to the air flow. If the cleaner is to be operated for sufficiently long periods of time at low air flows, the level may be raised to get more oil into the filter and, consequently, better washing action and greater dust removing efficiency. The passage of air takes place through the entrainment chamber 26 and around the annular shoulder 42, the air during such passage entraining oil contained in the entrainment chamber 26 and its extension 26a and moving upward through the prefilter 49. Upward passage of the oil-laden air is insured by the directing influence of the sloping barrier plate 55 and the cylindrical standpipe 60. Such movement of air and oil produces a low pressure zone above the standpipe 60 and in corresponding lower central regions of the prefilter 49 and the main filter 50. This low velocity and low pressure zone results in rapid spreading or migration of the oil and associated air transversely across the filter, and also facilitates oil separation from the air within the filter.

These conditions result in the larger proportion of the separated oil falling directly into the opening provided by the standpipe 60. As separation gets under way and the air moves the oil from the entrainment chamber 26 into the filter, the oil level drops from the initial level 85 to an equilibrium level somewhat above the annular oil passage 62, approximately as indicated by the broken line 86. At the same time, the oil accumulating in the standpipe 60, under the influence of the low pressure zone thereabove and by reason of the steady return of separated oil into the storage zone 56, rises in the upper portion of the standpipe 60 depending upon the air velocity through the cleaner and the pressure drop between the two orifices at 60 and 62. This results in a constantly stored body of oil having a constantly maintained substantial head which acts positively to force oil upward from the storage chamber 56 through the annular oil passage 62 to maintain an adequate supply of oil at an appropriate operating level such as that illustrated by the broken line 86.

The low pressure zone, which lies substantially centrally of the apparatus and at the top of the standpipe 60, is a result of the deflection of the greater proportion of the oil-laden air by the standpipe 60. This condition and consequent low pressure effect are, of course, greatly improved by the centrifugation functions and vortex action produced by the inclined vanes 25. These vanes cause the incoming air in the air intake passage 24 to generate centrifugal motion. This centrifugal motion aids greatly in the picking up of oil at the operating oil level 86, and also causes further lowering of the pressure in the low pressure zone. Such lower pressure further aids materially in the separation of the oil in the filter and its return through the central portion of the prefilter to the wide mouth of the standpipe 60 and the oil storage chamber 56. This maintains a high rate of oil circulation, facilitates separation of the oil from the filter packs, correspondingly greatly reduces restriction to air flow due to oil in the filter packs, and thereby makes it possible to operate highly efficiently with a comparatively small volume of oil. The vortex action together with the change in direction of the centrifugating air leaving the bottom of the air passage 24 causes some of the dust and dirt to be thrown out upon the barrier plate 55 and to travel along the plate 55 in a moving oil film and over the top of the standpipe 60, whence it is washed directly into the oil storage chamber 56 and to the oil sump. This avoids dirt overload in the filter during heavy dust concentrations. As the air passes into the filter, the turbulence produced in the meshes of the filter pack quickly stops the centrifugal component of motion and the oil-laden air spreads horizontally toward the low pressure region.

Another important function found in connection with the operation is that foreign bodies being washed from the air in the filter very largely pass with the returning oil directly into the oil storage chamber 56 where they have good opportunity to settle into the sump provided by the oil cup 68. As a result, comparatively clean oil passes upward through the annular passages 62 into the oil entrainment chamber 26.

With this apparatus it has been found that a minimum restriction to air flow is encountered because of rapid oil return, that low velocity air flows may be easily maintained even over long periods of operation without shutdown, such as the thirty day period above mentioned, and that the filter, including the prefilter 49, is maintained in thoroughly flushed condition, all of this being effected with a minimum body of oil and with maintenance of a minimum quantity of oil in the filter, but with large oil circulation. Much of this is due to the close proximity of the large opening in the top of the oil standpipe 60 to the underside of the prefilter 49 and hence to the principal point of return of the separated oil from the filter to the oil storage zone.

Air cleaners of this particular type are used primarily in the larger sizes having capacities up to 10,000 cubic feet per minute for large engines and compressors. Usually such equipment operates at constant speeds and their air requirements are constant for relatively long periods of time. However, these cleaners are also adapted for operation under conditions which vary somewhat from time to time, but in any event they handle large air volumes under relatively low air velocities. As above indicated, the resistance to air flow must be held at a minimum and consequently the volume of oil contained in the filter packs at any given time must be relatively small in order to reduce to a minimum the resistance of the oil in the filter packs to the air flow. The total filter depth is, of course, sufficient to efficiently remove all dust and dirt particles from the air, as well as to filter out from the air all oil particles before the air passes to the engine, compressor, or other piece of equipment being served. Similarly, the breadth of the filter is adequate to accommodate the required air volume at the required velocity. To expand upon the oil separation phenomenon, the oil is carried into the filters in droplets, and these impinge upon the surfaces of the resilient spring elements constituting the filter packs, to which filter elements they adhere. These droplets gradually coalesce and migrate by gravity, and under the influence of air working toward the low pressure zone, until the action of gravity overcomes the elevating influences of the rising air. As a result, the separated oil freely returns from the filters through the low pressure zone to the oil storage chamber 56 including that portion thereof within the standpipe 60.

The head produced within the standpipe 60 is equal to the air pressure drop between the oil surface in the standpipe 60, which as above stated is approximately at the upper edge of the standpipe, and the surface of the oil at the operating level indicated at 86. As additional oil falls into the standpipe 60, it displaces oil below the barrier plate 55 and thus causes oil to flow upward through the annular passage 66 into the oil entrainment chamber 26 where it is picked up by the air stream entering from the annular intake passage 24 and is again carried into the filter to repeat the cycle. With respect to the area of the narrow annular passage 66, this, of course, must be sufficient to allow oil to flow freely from the oil storage chamber 26 under the described head in the standpipe 60, but, at the same time, it is necessarily limited to the extent that the motion of the entering air in the oil entrainment chamber 26, especially under the whirling influence of the inclined vanes 25, can not pick up all of the oil from the passage 66, and especially can not pick up oil through the passage 66 from regions below the adjacent edge of the barrier plate 55. Thus, when equilibrium is accomplished after starting operation of the apparatus, the oil level during operation remains at approximately the level 86, the pressure drop, as above indicated, across the openings at 60 and 66 preventing the stored oil head from flowing back into and overfilling the chamber 26. The initial oil level 85 is necessarily high and therefore initially submerges a portion of the air passage through the chamber 26, but the submerging oil is soon transferred into the filters for the necessary contact effects and into the standpipe 60 to provide the required stored oil head. Such equilibrium conditions are soon accomplished because of the fact that the highest pressure in the apparatus exists along the outer wall of the entrainment chamber 26, this being augmented by the centrifugal motion effected by the inclined vanes 25.

Following considerable use, dirt and sludge may be recovered from the cup 68 by removal of the drain plug 80, to be followed by the addition of replacement oil through the filler cap 29. Also, the oil cup 68 may be removed and cleaned merely by detachment through the medium of the bolts 69. When it is required to replace or clean the prefilter 49, the outer casing 16 and the parts attached thereto are removed by withdrawing the bolts or screws 18, the casing being then lowered to render accessible the bolts 37 and 38 whereby to remove the angle support 36 and detach the prefilter 49, as well as to disconnect the supporting straps 39 and the barrier plate 55. When necessary, the bolts 35 and the angle ring 34 may be removed to clean or replace the main filter pack within the chamber 30. In this manner, the apparatus may be very easily serviced, although ordinarily it operates for long periods of time without any servicing whatever.

Since many variations of generic invention herein disclosed will, no doubt, occur to those skilled in the art, it is intended to cover all modifications falling within the scope of the claims.

I claim as my invention:

1. In combination in an air cleaner of the oil-bath type: inner wall means providing an elevated filter chamber of relatively large cross section; outer wall means spaced from said inner wall means and providing between them a chamber constituting an intake passage for incoming air, there being an oil entrainment zone below and connecting said chambers; oil storage means below said entrainment zone and providing an oil supply zone; a barrier wall between said entrainment zone and said oil supply zone, said barrier wall having a relatively large opening elevated with respect to said oil supply zone and disposed beneath a portion of said filter chamber and adapted to pass large proportions of oil descending from said filter chamber directly through said opening into said oil supply zone to provide an oil head, a peripheral oil inlet passage being provided below said opening for movement of oil under said head from said supply zone to said entrainment zone at an edge of said barrier wall remote from said opening; and means providing for movement of cleaned air from the upper portion of said filter chamber.

2. A combination as in claim 1 wherein said barrier wall extends laterally and upwardly from said oil inlet passage to said opening to provide a low pressure area above said opening and facilitate oil return from said filter chamber and into said supply zone.

3. A combination as in claim 1 wherein inclined vanes are provided in said air intake passage to produce centrifugal movement in air entering said entrainment zone, said barrier wall inclining toward said opening and upward to direct centrifugally moving air upward above said opening and thereby cause a vortex zone of low pressure above said opening to provide for rapid return of oil from said filter chamber into said supply zone.

4. A combination as in claim 1 including a main filter pack in the upper portion of said filter chamber, and a separate shallow transversely disposed filter pack removably carried by said inner wall means below said main filter pack and overlying said large opening for return of wash oil through said shallow filter pack and said large opening into said supply zone.

5. In combination in an oil-bath air cleaner: an inner filter housing enclosing a filter chamber of relatively large cross-sectional area; filtering means disposed within said chamber; an outer housing surrounding said filter housing and providing an annular air intake passage between the housings; wall means below said outer housing and enclosing an oil entrainment zone lying below said annular air intake passage and connecting said passage with the lower end of said filter chamber beneath said filter means; oil receiving means below said entrainment zone and providing an oil supply zone; a transverse barrier wall separating said supply zone from said entrainment zone, said wall having a relatively large central oil receiving opening elevated with respect to said supply zone and disposed beneath the central portion of said filter chamber for receiving a large proportion of oil descending from said filter chamber and providing direct communication between said central portion of said filter chamber and said supply zone for movement of oil from said central portion directly to said supply zone to establish an oil head in the central portion of said supply zone, said barrier wall providing adjacent said wall means an oil passage below said annular air intake passage and below said elevated opening, said oil passage leading from oil supply zone to said entrainment zone to supply oil to said entrainment zone; and means providing an outlet for cleaned air from said filter chamber.

6. A combination as in claim 5 wherein said barrier wall provides an upstanding annular edge member around said large opening which is elevated above said oil passage and serves to receive said descending oil and establish said oil head for forcing oil through said oil passage to said entrainment zone.

7. A combination as in claim 5 wherein said barrier wall has an upstanding edge member around said large opening which is elevated above said oil passage and serves to receive said descending oil and establish said oil head for feeding oil through said oil passage to said entrainment zone, said upstanding edge member acting to direct oil-laden air upward from said entrainment zone into said filter chamber and to create a low pressure zone above said opening facilitating descent of oil from said filter into said large central opening.

8. A combination as in claim 5 wherein said barrier wall has its central portion adjacent said large opening directed upward around said opening to feed oil-laden air upward into said filter chamber.

9. A combination as in claim 5 wherein said outer housing upstands concentrically around the major portion of said inner housing and renders said air intake passage tall and narrow, and wherein inclined vanes are positioned in said air intake passage to impart centrifugal motion to entering air and to oil-laden air leaving said entrainment zone, whereby a low pressure vortex is provided above said large opening.

10. A combination as in claim 5 wherein inclined vanes are positioned in said air intake passage to impart centrifugal motion to entering air and to oil-laden air leaving said entrainment zone, whereby a low pressure vortex is provided above said large opening, said barrier wall having its central portion around said opening turned upward to direct oil and air upward into said filter chamber and thereby further reduce pressure in the zone immediately above said opening in said barrier wall.

11. A combination as in claim 5 including a sump below said oil supply zone and said large opening to receive impurities settling beneath said opening.

12. A combination as in claim 1 including a sump below said oil supply zone and said large opening to receive impurities settling beneath said opening.

13. In combination in an air cleaner: an inner filter housing enclosing an elevated filter chamber; an outer housing surrounding and spaced from said filter housing and providing an annular air passage between the housings, said passage having an intake at the upper end thereof and having an outlet at the lower end thereof directed under said filter chamber; an overhanging rain guard above and around said outer housing and said inner housing and providing an outer, annular lip depending below the top of said outer housing; and a depending, annular air deflector on said guard and disposed laterally inward from said lip and outward from said outer housing, said deflector depending below the lower edge of said lip.

14. A combination as in claim 13 wherein said deflector depends below said lip a distance approximating the radial spacing of said deflector from said lip.

15. A combination as in claim 13 including an air filtering screen disposed at said intake and spanning the space between the underside of said rain guard and the upper edge portion of said outer housing.

KENNETH F. RUSSELL.

REFERENCES CITED

The following references are of record in the file of this patent:

UNITED STATES PATENTS

| Number | Name | Date |
|---|---|---|
| 2,198,963 | Garner | Apr. 30, 1940 |
| 2,341,771 | Hagar | Feb. 15, 1944 |
| 2,393,660 | Sebok | Jan. 29, 1946 |